United States Patent
Lee et al.

(10) Patent No.: US 10,840,837 B2
(45) Date of Patent: Nov. 17, 2020

(54) POWER SEAT SYSTEM FOR SENSING MOTOR REVERSE ROTATION AND METHOD THEREOF

(71) Applicant: HYUNDAI DYMOS INCORPORATED, Seosan-si (KR)

(72) Inventors: Ho Cheoul Lee, Osan-si (KR); Deuk Kyu Byun, Gunpo-si (KR); Jin Woo Lee, Suwon-si (KR); Min Jin Kim, Hwaseong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 38 days.

(21) Appl. No.: 16/223,618

(22) Filed: Dec. 18, 2018

(65) Prior Publication Data

US 2019/0123667 A1    Apr. 25, 2019

Related U.S. Application Data

(63) Continuation of application No. PCT/KR2017/006595, filed on Jun. 22, 2017.

(30) Foreign Application Priority Data

Jul. 19, 2016 (KR) .................. 10-2016-0091668

(51) Int. Cl.
*H02P 8/32* (2006.01)
*B60N 2/02* (2006.01)
(Continued)

(52) U.S. Cl.
CPC .................. *H02P 8/32* (2013.01); *B60N 2/02* (2013.01); *B60N 2/0232* (2013.01);
(Continued)

(58) Field of Classification Search
CPC .. H02H 7/0851; H02H 3/006; H02P 29/0241; H02P 29/60
See application file for complete search history.

(56) References Cited

U.S. PATENT DOCUMENTS

| | | | |
|---|---|---|---|
| 2009/0055055 A1* | 2/2009 | Schussler | B60N 2/0244 701/49 |
| 2013/0154534 A1* | 6/2013 | Okada | G05D 3/20 318/490 |
| 2014/0265978 A1* | 9/2014 | Oakley | H02P 29/0241 318/473 |

FOREIGN PATENT DOCUMENTS

| | | |
|---|---|---|
| JP | 2001-277909 A | 10/2001 |
| JP | 2013-129251 A | 7/2013 |

(Continued)

OTHER PUBLICATIONS

International Search Report issued in corresponding International Application No. PCT/KR2017/006595 dated Sep. 6, 2017, with translation (5 pages).

*Primary Examiner* — Zoheb S Imtiaz
(74) *Attorney, Agent, or Firm* — Osha Liang LLP

(57) ABSTRACT

A power seat system includes: a motor that changes a position of a power seat by performing a rotational operation; a Hall sensor that senses a change in Hall voltage according to the rotation of the motor and outputs a pulse signal; and a motor reverse rotation detection unit that monitors outputs from the motor and the Hall sensor, and detects an occurrence of a reverse pulse according to a motor reverse rotation when a motor current overshooting section and a change in pulse signal value are simultaneously detected in accordance with stop of the motor.

3 Claims, 6 Drawing Sheets

(51) Int. Cl.
*H02P 29/024* (2016.01)
*H02P 8/20* (2006.01)
*H02P 8/34* (2006.01)
*A47C 31/12* (2006.01)

(52) U.S. Cl.
CPC .............. *B60N 2/0244* (2013.01); *H02P 8/20* (2013.01); *H02P 8/34* (2013.01); *H02P 29/0241* (2016.02); *A47C 31/126* (2013.01); *B60N 2002/0268* (2013.01)

(56) References Cited

FOREIGN PATENT DOCUMENTS

| KR | 10-2004-0049373 A | 6/2004 |
| KR | 10-2010-0059274 A | 6/2010 |
| KR | 10-2013-0021559 A | 3/2013 |
| KR | 10-2013-0039104 A | 4/2013 |

* cited by examiner (a) EQUIVALENT CIRCUIT OF MOTOR WHEN MOTOR ROTATES (b) EQUIVALENT CIRCUIT OF MOTOR WHEN MOTOR IS STOPPED WHEN MOTOR IS STOPPED, BOTH ENDS OF VC ARE SHORT-CIRCUITED AND MOTOR ELECTROMOTIVE FORCE VEMF IS GENERATED --> CURRENT HAVING DIRECTION OPPOSITE TO DIRECTION WHEN MOTOR ROTATES IS GENERATED

POWER SEAT SYSTEM FOR SENSING MOTOR REVERSE ROTATION AND METHOD THEREOF

TECHNICAL FIELD

The present invention relates to a power seat system and a method of detecting a motor reverse rotation in the power seat system, and more particularly, to a power seat system and a method of detecting a motor reverse rotation in the power seat system, which are capable of detecting a reverse rotation of a power seat motor by using a simpler structure.

BACKGROUND

Typically, examples of auxiliary devices provided in a vehicle to provide convenience to a driver include a power seat that automatically adjusts a position of a seat so that even persons having different body conditions may drive the vehicle under the best condition every time the persons drive the vehicle.

The basic purpose of adjusting the position of the power seat is to enable the driver to drive the vehicle in a comfortable posture at a position most suitable for his/her height and thus to contribute to safe driving because people typically have different height or sitting postures.

It is necessary to accurately detect a rotational speed, a rotation amount, a rotation direction, and the like of a power seat motor in order to adjust the position of the power seat, and to this end, a Hall sensor is applied.

However, most power seats, which are being currently developed for mass production, each adopt a single Hall sensor, and the power seat having the single Hall sensor has a drawback in that switching of a moto rotation direction cannot be recognized. Since the motor rotation direction cannot be detected, the presence or absence of a motor reverse rotation, which occurs when the motor is stopped, cannot be ascertained. For this reason, it is difficult to attain good results in a position reproducibility test for the power seat.

Korean Patent Application Laid-Open No. 10-2004-0049373 discloses a means for detecting a motor rotation direction by applying two Hall sensors and using a phase difference between two pulses. However, the two Hall sensors needs to be necessarily provided, which causes manufacturing costs to increase.

SUMMARY

One or more embodiments of the present invention provide a power seat system which may be implemented by using a single Hall sensor and provide a method of detecting a motor reverse rotation in the power seat system.

One or more embodiments of the present invention provide a power seat system and a method of detecting a motor reverse rotation in the power seat system, which are capable of enabling a more accurate and precise analysis based on a motor current generation pattern and a pulse signal generation pattern.

The present invention is not limited to the aforementioned embodiments.

One or more embodiments of the present invention provide a power seat system including: a motor which changes a position of a power seat by performing a rotational operation; a Hall sensor which senses a change in Hall voltage according to the rotation of the motor and creates and outputs a pulse signal; and a motor reverse rotation detection unit which monitors outputs from the motor and the Hall sensor and detects and notifies an occurrence of a reverse pulse according to a motor reverse rotation when a motor current overshooting interval and a change in pulse signal value are simultaneously detected in accordance with stop of the motor.

A motor position may be increased each time the pulse signal value is changed, and the power seat system may further include a motor control unit which decreases the motor position when the motor control unit is notified of the occurrence of the reverse pulse according to the motor reverse rotation.

The motor control unit may further include a function of controlling a rotation direction and a rotational speed of the motor in order to move the position of the power seat.

One or more embodiments of the present invention provide a method of detecting a motor reverse rotation in a power seat system having a motor, and a Hall sensor which senses a change in Hall voltage according to a rotation of the motor and creates and outputs a pulse signal, the method including: monitoring outputs from the motor and the Hall sensor; checking, when the motor is requested to stop, whether a motor current overshooting interval and a change in pulse signal value are simultaneously detected in accordance with the stop of the motor, and detecting an occurrence of a reverse pulse according to a motor reverse rotation; and decreasing a motor position when the occurrence of the reverse pulse according to the motor reverse rotation is detected, or otherwise increasing the motor position each time the pulse signal value is changed.

The method may further include maintaining a previously calculated motor position when the motor current overshooting interval according to the stop of the motor is detected and no change in pulse signal value is detected.

According to one or more embodiments of the present invention as described above, it is possible to ascertain an erroneous operation of the motor by using the single Hall sensor based on a motor current, and as a result, it is possible to minimize costs and efforts for implementing the power seat system.

In addition, it is possible to detect whether the motor reverse rotation occurs when the motor is stopped and whether the reverse pulse is generated during the motor reverse rotation based on the motor current generation pattern and the pulse signal generation pattern, and as a result, it is possible to enable a more accurate and precise analysis.

DETAILED DESCRIPTION

The present invention and technical configurations will be clear with reference to one or more embodiments described in detail below together with the accompanying drawings. In the description of embodiments of the present invention, the specific descriptions of publicly known functions or configurations will be omitted when it is determined that the specific descriptions may unnecessarily obscure the subject matter of the present invention.

Further, the terms used in the following description are defined considering the functions in one or more embodiments of the present invention and may vary depending on the intention or usual practice of a user or an operator.

However, the present invention is not limited to embodiments disclosed below, and may be embodied in various other forms. The embodiments are provided so that the present invention is completely disclosed, and a person of ordinary skilled in the art can fully understand the scope of the present invention. Therefore, the present invention will be defined only by the scope of the appended claims. Therefore, the definitions thereof should be made based on the entire contents of the present specification.

Figure 1:
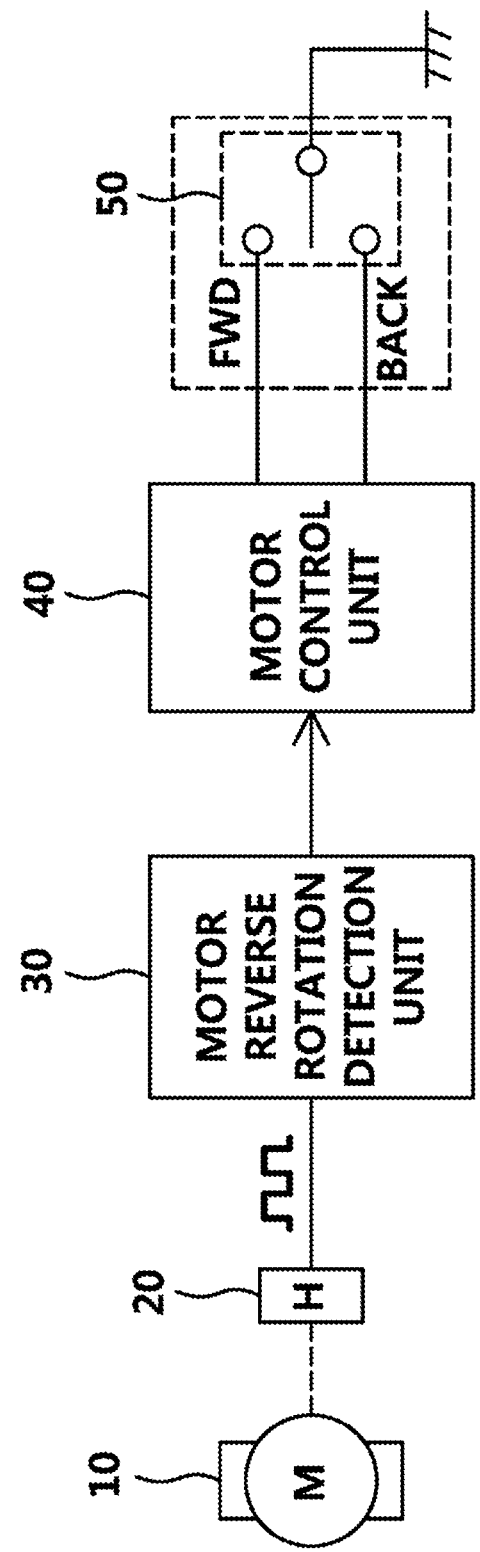
FIG. 1 is a view illustrating a power seat system according to one or more embodiments of the present invention.

FIG. 1 is a view illustrating a power seat system according to one or more embodiments of the present invention.

Referring to FIG. 1, the power seat system according to one or more embodiments of the present invention may include a motor 10 (M), a Hall sensor 20 (H) which corresponds to the motor 10, a motor reverse rotation detection unit 30, a motor control unit 40, and a switch module 50. That is, in one or more embodiments of the present invention, only the single Hall sensor 20 is provided, and based on a pulse signal generation pattern of the Hall sensor 20 and a current generation pattern of the motor 10, a reverse pulse caused by a motor reverse rotation, which occurs when the motor is stopped, may be detected.

The motor 10 is rotated by being controlled by the motor control unit 40 to change a position of a power seat. The Hall sensor 20 is positioned outside the motor 10 and outputs, in the form of a pulse, a change in Hall voltage that occurs due to a rotation of the motor.

Figure 2:
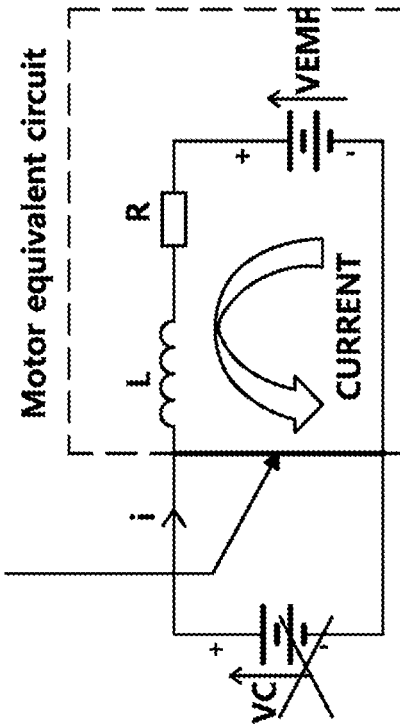
FIG. 2 is a view illustrating an equivalent circuit of a motor according to one or more embodiments of the present invention.
Figure 2:
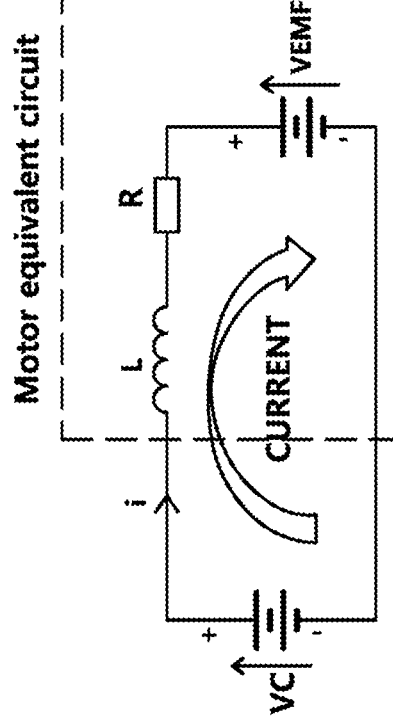

FIG. 2 is a view illustrating an equivalent circuit of the motor according to one or more embodiments of the present invention. Referring to FIG. 2, the motor 10 may be expressed as an equivalent circuit including inductance L, resistance R, and motor voltage VEMF which are connected in series to VC both ends of a power source unit.

A motor current flows toward the motor voltage VEMF from a drive power source VC, as illustrated in FIG. 2A, while the motor is rotated. When the motor stop is requested, both ends of the drive power source VC are short-circuited, as illustrated in FIG. 2B, and back electromotive force (Back EMF) is generated in the motor, such that the motor current flows toward the drive power source VC from the motor voltage VEMF. That is, when the motor stop is requested, the motor current, which has a direction opposite to a direction when the motor rotates, flows for a moment and then is dissipated gradually.

However, when a reverse rotation occurs as the motor is stopped, a current, which has a direction identical to the direction when the motor operates, flows again.

Figure 3A:
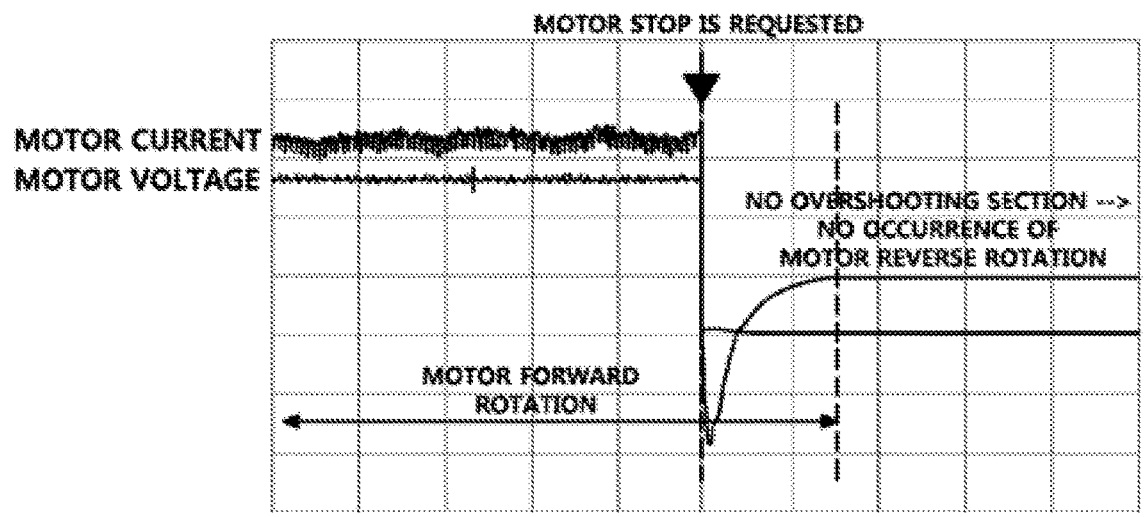
FIG. 3A is a view illustrating examples of a motor current and a pulse signal which are detected according to one or more embodiments of the present invention.
Figure 3B:
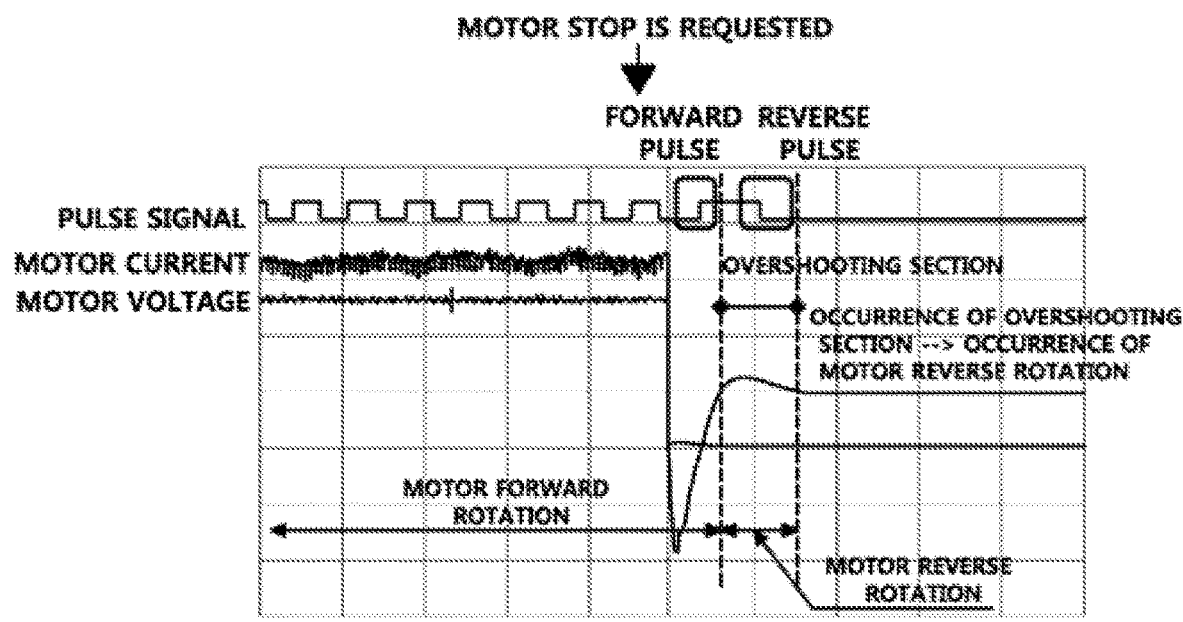
FIG. 3B is a view illustrating examples of a motor current and a pulse signal which are detected according to one or more embodiments of the present invention.

Therefore, as illustrated in FIG. 3A, when the motor is normally stopped without the reverse rotation, a motor current value is rapidly changes from a + value to a − value and then gradually converges on a "0" value without separate overshooting. However, as illustrated in FIG. 3B, when the motor reverse rotation occurs as the motor is stopped, the motor current value is rapidly changed from a + value to a − value and then gradually converges on the "0" value through an overshooting interval. Here, the overshooting interval may be defined as an interval in which a current, which flows in a direction identical to the direction when the motor operates, is temporarily generated.

Therefore, in one or more embodiments of the present invention, a motor reverse rotation, which occurs when the motor is stopped, is simply detected based on a motor current change pattern after the motor is stopped.

Further, there occurs no particular miscalculation when calculating a motor position if a pulse caused by the motor reverse rotation is not sensed. However, if the pulse caused by the motor reverse rotation is sensed, an error occurs when calculating the motor position. In other words, the motor control unit 40 merely calculates that the position of the motor is increased each time a pulse is generated, but the motor control unit 40 cannot consider directionality of the motor. As a result, there occurs an error which calculates that the motor position is unconditionally increased even in a case in which the reverse pulse is generated due to the motor reverse rotation.

Accordingly, the motor reverse rotation detection unit 30 according to one or more embodiments of the present invention monitors a generation pattern of the pulse signals as well as the motor current change pattern, and detects and notifies the reverse pulse caused by the motor reverse rotation as well as the motor reverse rotation.

Further, the motor control unit 40 is configured to perform an operation of calculating the motor position in consideration of the generation of the reverse pulse caused by the motor reverse rotation, thereby ensure accuracy of the operation of the system. That is, the motor position is increased each time the pulse signal value is changed, but when the generation of the reverse pulse caused by the motor reverse rotation is ascertained, the motor position is decreased to enable the motor position to be accurately calculated.

In addition, the motor control unit 40 according to one or more embodiments of the present invention determines whether to operate the motor 10, a rotation direction, and a speed based on a user control value acquired through the switch module 50, and controls an operation of the motor, thereby enabling the power seat to have a position value requested by the user.

Figure 4:
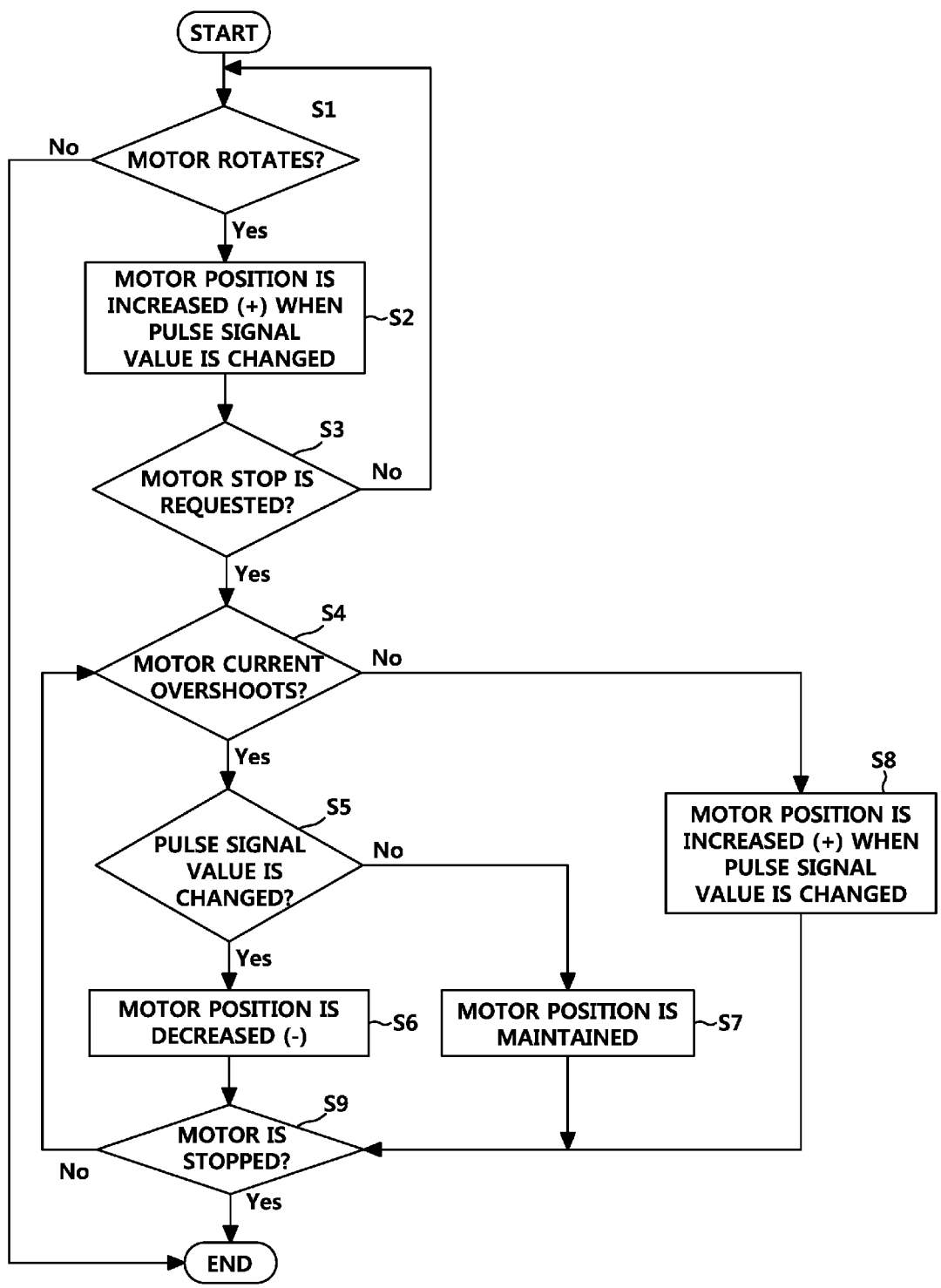
FIG. 4 is a view for explaining a method of detecting a motor reverse rotation in the power seat system according to one or more embodiments of the present invention.

FIG. 4 is a view for explaining a method of detecting a motor reverse rotation in the power seat system according to one or more embodiments of the present invention.

When the motor rotates (S1), the Hall sensor 20 generates and outputs a pulse signal according to the rotation of the motor, and the motor control unit 40 increases the motor position each time the pulse signal value is changed (S2).

When the motor stop is requested during the rotation of the motor (S3), the motor control unit 40 immediately cuts off a supply of drive voltage to the motor 10, and the motor reverse rotation detection unit 30 detects whether the motor reverse rotation occurs based on the motor current generation pattern in response to the operation of the motor control unit 40. That is, the motor reverse rotation detection unit 30 detects the occurrence of the motor reverse rotation caused by the stop of the motor by checking whether the motor current value is rapidly changed from a + value to a − value and then converges on the "0" value after passing the overshooting interval (S4).

When the motor current overshooting is detected in step S4, the motor reverse rotation detection unit 30 detects the occurrence of the reverse pulse caused by the motor reverse rotation by additionally checking whether the pulse signal value is changed while the motor current overshooting is detected (S5).

If the reverse pulse caused by the motor reverse rotation is detected, the motor control unit 40 decreases the motor position (S6). If only the motor reverse rotation is detected, the motor control unit 40 maintains the previously calculated motor position (S7).

Meanwhile, if neither motor reverse rotation nor reverse pulse caused by the motor reverse rotation is detected, the motor control unit 40 determines that the motor is being normally stopped, and then increases the motor position each time the pulse signal value is changed (S8).

The aforementioned steps S4 to S8 are repeatedly performed until the motor is completely stopped, and the operation is stopped when the motor is completely stopped (S9).

However, as described above, the power seat system, which has the single motor 10, the single Hall sensor 20, and the single motor reverse rotation detection unit 30 and moves the power seat in one direction, has been described for convenience of description.

Figure 5:
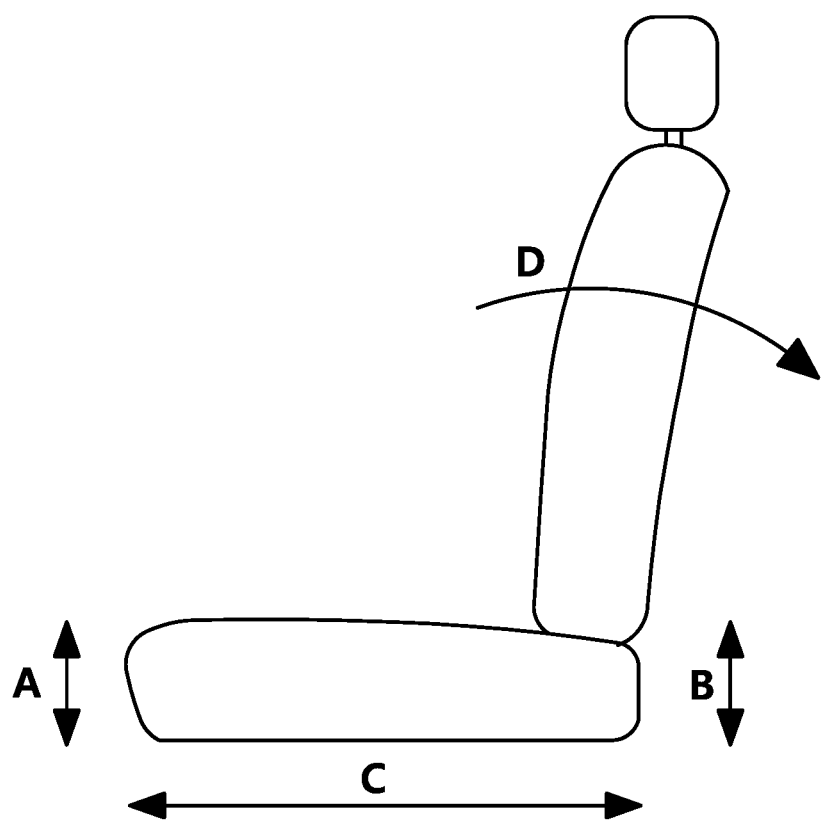
FIGS. 5 and 6 are views illustrating an example in which the power seat system according to one or more embodiments of the present invention is applied.
Figure 6:
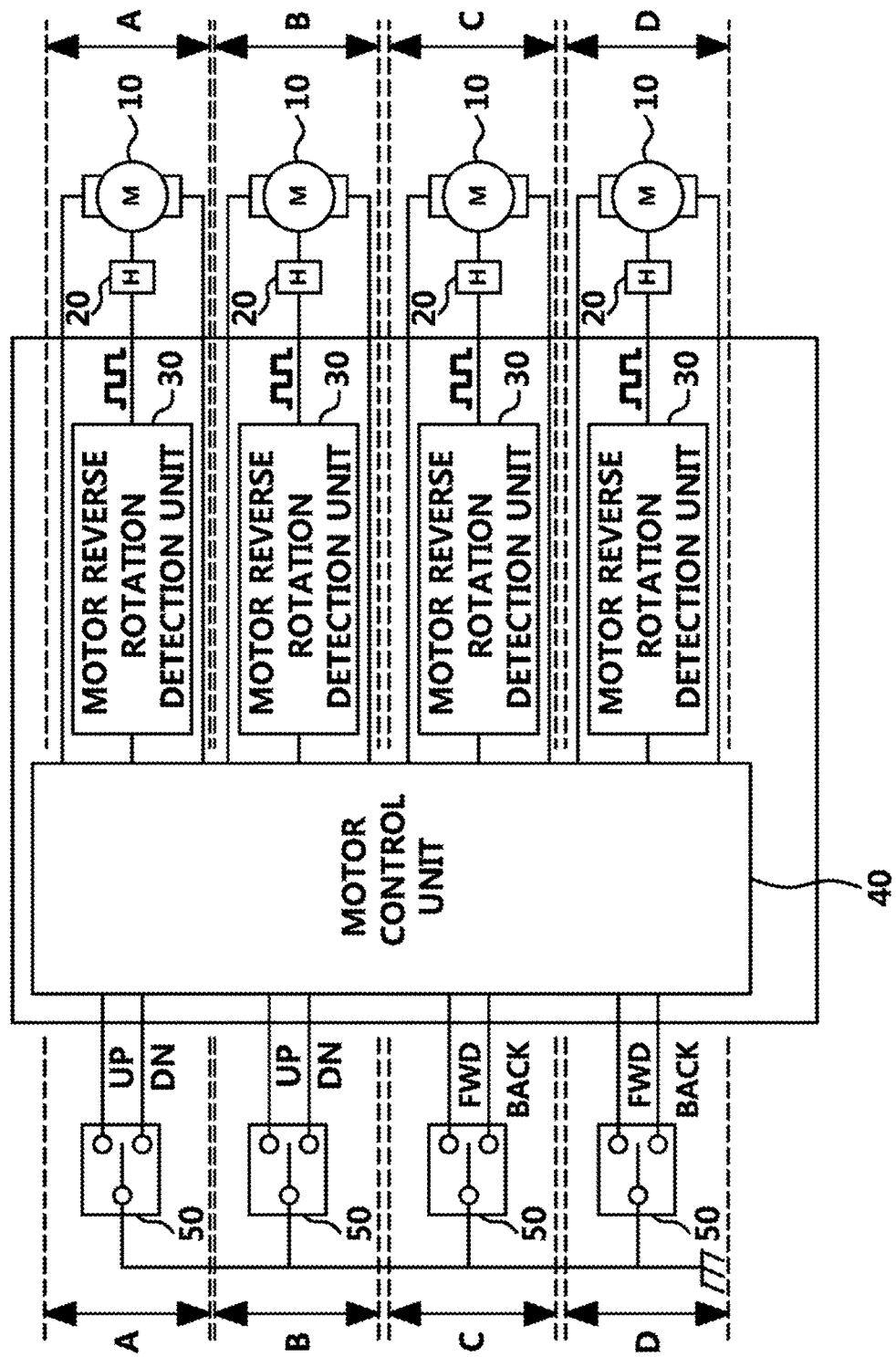

However, in a case in which the power seat is positioned and moved in N (N is a natural number equal to or more than 2) directions as illustrated in FIG. 5, the N motors 10, the N Hall sensors 20, and the N motor reverse rotation detection units 30 in FIG. 1 are provided, as illustrated in FIG. 6, so as to be able to detect, for each direction, the occurrence of the reverse pulse according to the motor reverse rotation and perform an operation of correcting the position and the movement.

In addition, in some instances, the N motor reverse rotation detection units 30 may of course be integrated into a single device to simplify the structure.

The above description is simply given for illustratively describing the technical spirit of the present invention, and those skilled in the art will appreciate that various modifications and changes are possible, without departing from the essential characteristic of the present invention. Therefore, embodiments of the present invention are provided for illustrative purposes only but not intended to limit the technical concept of the present invention. The scope of the technical concept of the present invention is not limited thereto. The protective scope of the present invention should be construed based on the following claims, and all the technical spirit in the equivalent scope thereto should be construed as falling within the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A power seat system comprising: a motor that changes a position of a power seat by performing a rotational operation; a Hall sensor that senses a change in Hall voltage according to a rotation of the motor and outputs a pulse signal; a motor reverse rotation detection unit that monitors outputs from the motor and the Hall sensor, and detects an occurrence of a reverse pulse according to a motor reverse rotation when a motor current overshooting interval and a change in pulse signal value are simultaneously detected in accordance with stoppage of the motor; and a motor control unit that decreases a motor position upon being notified, by the motor reverse rotation detection unit, of the occurrence of the reverse pulse according to the motor reverse rotation, wherein the motor control unit increases the motor position each time the pulse signal value is changed but no motor current overshooting interval is detected, and the motor control unit maintains a previously calculated motor position when the motor current overshooting interval according to the stoppage of the motor is detected but no change in pulse signal value is detected.

2. The power seat system according to claim 1, wherein the motor control unit further controls a rotation direction and a rotational speed of the motor to move the position of the power seat.

3. A method of detecting a motor reverse rotation in a power seat system having a motor and a Hall sensor that senses a change in Hall voltage according to a rotation of the motor and outputs a pulse signal, the method comprising: monitoring outputs from the motor and the Hall sensor; detecting an occurrence of a reverse pulse according to a motor reverse rotation when a motor current overshooting interval and a change in pulse signal value are simultaneously detected in accordance with stoppage of the motor; decreasing a motor position when the occurrence of the reverse pulse according to the motor reverse rotation is detected; increasing the motor position each time the pulse signal value is changed but no motor current overshooting interval is detected; and maintaining a previously calculated motor position when the motor current overshooting interval according to the stoppage of the motor is detected but no change in pulse signal value is detected.

* * * * *